June 18, 1968     T. M. FLEMING ET AL     3,388,823
DOUBLE CHAMBER COMPRESSED FLUID RESERVOIR
Filed Jan. 11, 1967
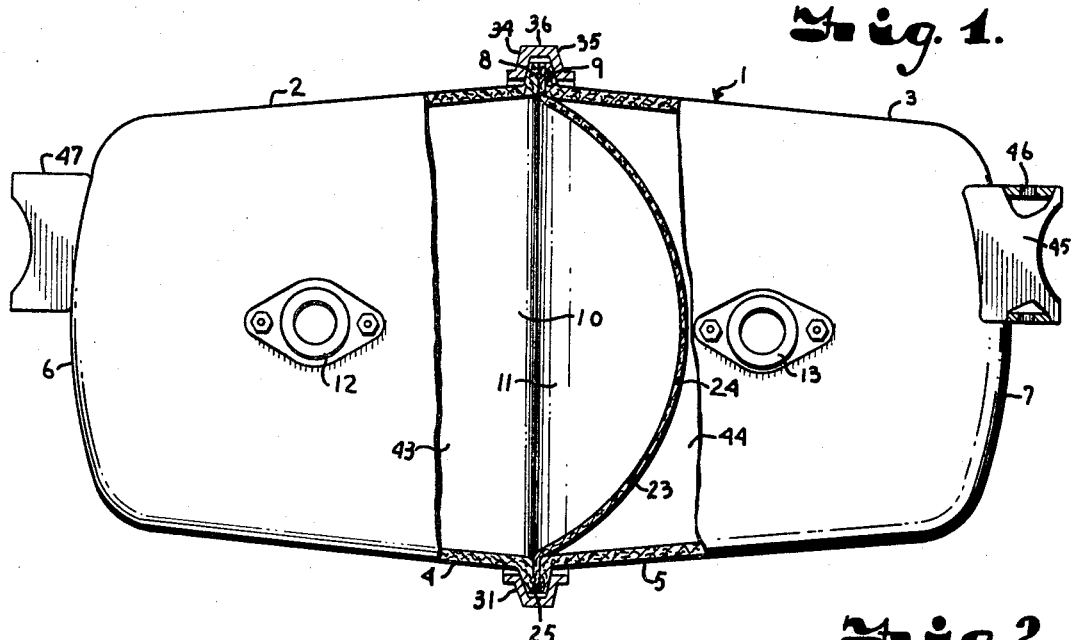
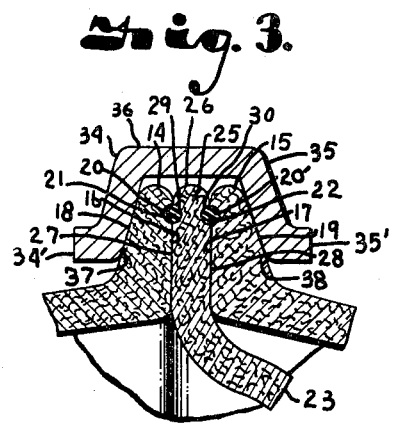
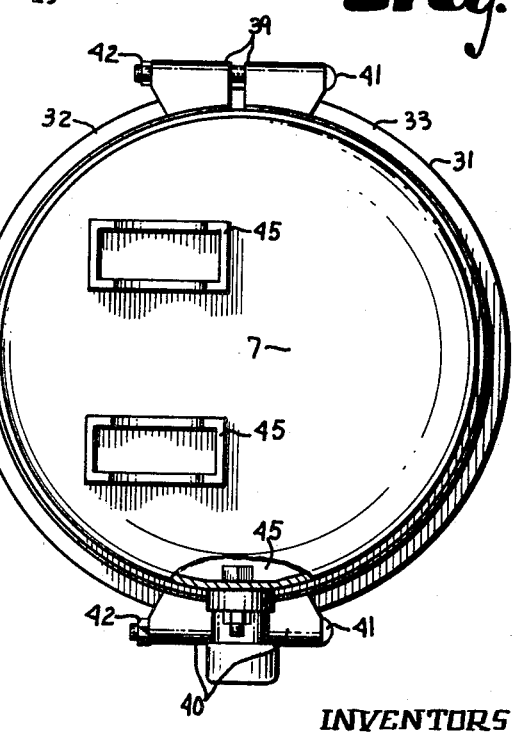
INVENTORS
JOSEPH R FLEMING
& THOMAS M. FLEMING
BY *Fishburn & Gold,*
ATTORNEYS

# United States Patent Office 3,388,823
Patented June 18, 1968

3,388,823
DOUBLE CHAMBER COMPRESSED
FLUID RESERVOIR
Thomas M. Fleming, Leawood, and Joseph R. Fleming,
Prairie Village, Kans., assignors to T. J. Fleming Co.,
Kansas City, Kans., a corporation of Missouri
Filed Jan. 11, 1967, Ser. No. 608,531
1 Claim. (Cl. 220—5)

ABSTRACT OF THE DISCLOSURE

Opposed bowl shaped tank members of non-metallic material each have a circular flange defining an open end. A dome shaped separation member of non-metallic material closes both open ends and has a circular flange sandwiched between the tank member flanges, the sandwiched condition being maintained by a removable U-shaped strap extending around the reservoir and urging the tank member flanges toward the separation member flange.

Background of the invention

This invention relates to pressure vessels, and more particularly, to a double chamber reservoir constructed primarily of synthetic resin.

Compressed fluid reservoirs or pressure vessels are in common use. The vast majority of such vessels are of welded, riveted, or bolted metal construction, although pressure vessels of non-metallic materials such as synthetic resin and impregnated fiberglass are not unknown. In certain applications, for example in railroad air-brake mechanisms, to applicant's knowledge, metal tanks of a specialized standard design have heretofore been used exclusively. Such vessels are composed of a pair of mating bowl portions with a domed separation plate therebetween for separating enclosed space into a pair of non-communicating chambers, one being used as an auxiliary air reservoir and the other as an emergency air reservoir. These metal air-brake tanks each weigh approximately 250 pounds and in use are exposed to severe operating conditions such as widely fluctuating environmental temperatures, rough handling, particle abrasion, corrosive chemicals, long periods of vibration and frequent heavy shock loading. In order to provide a long service life, such tanks are formed of thick, durable metal and the fittings used to assemble the various parts are of high quality and liberally provided for high strength and endurance. Thus 16 sets of nuts and bolts are normally used for assembling the bowl portions to both sides of the separation plates. Considerable labor is required to properly assemble the tank and further difficulties result from relatively frequent disassembly which is necessary for tank repair as well as the need for periodic inspection to insure that the bolts remain properly tight.

Summary of the invention

This invention provides a double chamber compressed fluid reservoir of non-metallic material which is suitable for railroad air-brake mechanism application and yet weighs approximately one-sixth of that standard metallic vessel. A principal advantage resides in such a vessel which is composed of few parts that are easily assembled and disassembled, eliminating the considerable labor requirements heretofore associated with mounting, inspection and maintenance. Further objects of this invention are: to provide such a double chamber reservoir which is chemical and abrasion resistant and is relatively unaffected by frequent changes in environmental temperature; to provide such a vessel structure which exhibits high resistance to vibration and shock loading; and to provide such a pressure vessel assembly which is simple in design, relatively inexpensive to manufacture, exhibits a long, useful life, and is easily handled by one person.

Other objects and advantages of this invention will become apparent from the following description taken in connection with the accompanying drawings wherein are set forth by way of illustration and example a certain embodiment of this invention.

Brief description of the drawings

FIG. 1 is a side elevation of a double chamber air reservoir embodying this invention with portions broken away to show interior structure.

FIG. 2 is an end elevation of the assembly with a portion broken away showing an access port forming member secured thereto.

FIG. 3 is a fragmentary cross-sectional view through the reservoir assembly on an enlarged scale, particularly showing the flange and retaining structure between the reservoir members and a central separation member.

Description of the preferred embodiment

The reference numeral 1 generally indicates an air reservoir assembly embodying this invention. The assembly 1 comprises first and second bowl shaped tank members 2 and 3 of cured resin bonded fiberglass, each having a generally cylindrical side wall respectively designated 4 and 5 and integral end walls 6 and 7. The tank members 2 and 3 each have radially outwardly directed annular flanges 8 and 9 respectively integral with side walls 4 and 5 and defining open ends 10 and 11 at the opposite end of the tank members from the respective end walls 6 and 7. The side walls 4 and 5 have side openings therethrough coinciding with pressure hose junction members 12 and 13 forming access ports through the side walls into the respective tank members 2 and 3.

The tank member flanges 8 and 9 are axially aligned with each other and respectively have outside peripheral edges 14 and 15 of substantially equal diameter. The tank member flanges 8 and 9 also have front circular faces 16 and 17 directed toward each other and rear circular faces 18 and 19 facing rearwardly toward the respective end walls 6 and 7 and sloping toward the front faces 16 and 17 in the direction of the peripheral edges 14 and 15, FIG. 3. Annular grooves 20 and 20' respectively extend into the front faces 16 and 17 and contain resilient O ring seals 21 and 22 therein. The grooves 20 and 20', however, are more shallow than the diameter of the O ring seals whereupon a portion of the seals project from the surface of the respective faces.

A separation member 23 is formed of cured resin bonded fiberglass and comprises a dome shaped wall 24. A radially outwardly directed annular flange 25 is integral with and surrounds the dome shaped wall 24. The separation member flange 25 is located or sandwiched between and axially aligned with the tank member flanges 8 and 9 and has an outside peripheral edge 26 gnerally corresponding in diameter to that of the peripheral edges 14 and 15. The separation member flange 25 has opposed circular faces 27 and 28 with grooves 29 and 30 therein corresponding to the grooves 20 and 20' and receiving the projecting O ring portions therein, FIG. 3.

A retainer 31 comprises a pair of semi-circular rigid straps 32 and 33 of substantially U shape in cross section and having spaced apart side walls 34 and 35 and an integral outside end wall 36 therebetween. Feet 34' and 35' project laterally from the side walls 34 and 35, acting as stiffeners. The strap side walls 34 and 35 form inner surfaces 37 and 38 sloping toward each other in the direction of the end wall 36. Sets of clamping members 39 and 40 are secured to the ends of the respective straps 32 and 33 and contain aligned bore openings for receiving elongated bolts 41 therethrough. Nuts 42 threadedly engage the bolts 41 and, when tightened, draw the straps 32 and 33 toward each other around the flanges 8, 9, and 25. As the strap members 32 and 33 are tightened around the flanges, the inner surfaces 37 and 38 engage the flange rear faces 18 and 19 urging the flanges 8 and 9 toward each other with the flange 25 therebetween producing sealing engagement between all three flanges. With the tank members and separation member so assembled, closed chambers 43 and 44 are produced within the assembly which are completely isolated from each other by means of the separation wall 24.

A pair of mounting lugs 45 are comprised of cured resin bonded fiberglass and are secured by a suitable adhesive in spaced apart relation on the end wall 7 of the tank member 3. The lugs 45 have suitable bolt receiving openings 46 therethrough for suitably mounting the assembly on conventional brackets (not shown) found on railroad cars. A single lug 47, similar to the lugs 45, is mounted on the end wall 6 in the same manner as the lugs 45 and supports the opposite end of the assembly.

By forming the assembly components with the flanges above described, the various parts may be rapidly assembled and disassembled with a minimum of effort, and yet, an effective and proper seal is produced therebetween. It is to be understood that although one form of this invention has been illustrated and described it is not to be limited thereto except insofar as such limitations are included in the following claim.

What we claim and desire to secure by Letters Patent is:

1. A double chamber air reservoir assembly comprising:
    (a) first and second tank members, each having a generally cylindrical side wall and an end wall, said first and second tank members each having an annular flange defining facing tank member open ends, means forming access ports through said side walls into said first and second tank members,
    (b) said tank member flanges being axially aligned and having front circular faces directed toward each other and rear circular faces, said front faces each having an annular groove extending thereinto and surrounding said side walls,
    (c) a rigid, integral separation member having a wall separating the interiors of said tank members and an annular flange surrounding said separation member wall, said separation member flange being located between and aligned with said tank member flanges and having opposed circular faces corresponding to and facing said respective front faces, said last named faces each having an annular groove aligned with said respective front face grooves,
    (d) a retainer comprising strap means of substantially U shape in cross-section and having spaced apart side walls forming inner surfaces sloping toward each other, clamping members associated with said strap means and adapted to tighten same around said tank member flanges and separation member flange with said inner surfaces engaging said rear faces, and O ring seals in each of said separation member grooves and projecting into the corresponding tank member grooves, whereby said tank members and separation member are maintained in aligned and sealed relation.

References Cited
UNITED STATES PATENTS

| | | | |
|---|---|---|---|
| 2,092,392 | 9/1937 | Hewitt | 220—22 |
| 2,939,603 | 6/1960 | Young | 220—46 XR |
| 3,025,992 | 3/1962 | Humphrey | 220—5 |
| 3,043,465 | 7/1962 | Horner | 220—5 |
| 3,045,857 | 7/1962 | Lineweber | 220—5 |
| 3,193,129 | 7/1965 | Pfluger | 220—80 XR |

THERON E. CONDON, *Primary Examiner.*

G. E. LOWRANCE, *Examiner.*